(12) United States Patent
Eguchi (10) Patent No.: US 11,933,252 B2
(45) Date of Patent: Mar. 19, 2024

(54) SEALING DEVICE

(71) Applicant: NOK CORPORATION, Tokyo (JP)

(72) Inventor: Nobuyuki Eguchi, Kitaibaraki (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 17/257,085

(22) PCT Filed: Aug. 5, 2019

(86) PCT No.: PCT/JP2019/030749
§ 371 (c)(1),
(2) Date: Dec. 30, 2020

(87) PCT Pub. No.: WO2020/090180
PCT Pub. Date: May 7, 2020

(65) Prior Publication Data
US 2021/0363945 A1    Nov. 25, 2021

(30) Foreign Application Priority Data

Oct. 29, 2018   (JP) .................................. 2018-202819

(51) Int. Cl.
*F02M 26/11* (2016.01)
*F02M 26/70* (2016.01)
(Continued)

(52) U.S. Cl.
CPC ............ *F02M 26/11* (2016.02); *F02M 26/70* (2016.02); *F16J 15/3212* (2013.01); *F16J 15/3228* (2013.01); *F16J 15/3252* (2013.01)

(58) Field of Classification Search
CPC .. F16J 15/3204; F16J 15/3252; F16J 15/3228; F16J 15/3212
See application file for complete search history.

(56) References Cited

U.S. PATENT DOCUMENTS 2,493,255 A * 1/1950 Lillis .................... F16J 15/3252
277/575
2,709,098 A * 5/1955 Kosatka Thomas .........................
F16J 15/3252
277/577

(Continued)

FOREIGN PATENT DOCUMENTS

CN         101922554 A     12/2010
CN         204592290 U      8/2015
(Continued)

OTHER PUBLICATIONS

Chinese Office Action dated Jun. 6, 2022 with English Machine Translation (corresponding to CN 201980044015.9).

(Continued)

*Primary Examiner* — Eugene G Byrd
*Assistant Examiner* — L. Susmitha Koneru
(74) *Attorney, Agent, or Firm* — Harness, Dickey & Pierce, P.L.C.

(57) ABSTRACT

A sealing device includes a metal ring 110 with a cylindrical section 111 and an inward flange section 112 disposed at one end of the cylindrical section 111. A resin seal 120 has an outer circumference side fixed to the metal ring 110 and an inner circumference side configured to slidably and closely come into contact with an outer circumference surface of the rotary shaft in a state deformed to curve toward a sealing target region. A flat spring 130 includes a plate-shaped annular metal member and has an outer circumference side fixed to the metal ring 110 and an inner circumference side configured to deform to curve along the resin seal 120 and press the inner circumference side of the resin seal 120 radially inward. A metal slide bearing 140, is sandwiched between the resin seal 120 and the inward flange section 112

(Continued)

and configured to slide on the outer circumference surface of the rotary shaft.

14 Claims, 10 Drawing Sheets

(51) Int. Cl.
*F16J 15/3212* (2016.01)
*F16J 15/3228* (2016.01)
*F16J 15/3252* (2016.01)

(56) References Cited

U.S. PATENT DOCUMENTS

| | | | | | |
|---|---|---|---|---|---|
| 3,482,845 | A | * | 12/1969 | Bertrandi | F16J 15/3244 277/559 |
| 3,973,782 | A | * | 8/1976 | Evans | F16J 15/3252 277/394 |
| 4,131,285 | A | * | 12/1978 | Denton | F16J 15/3248 277/560 |
| 4,427,201 | A | * | 1/1984 | Belsanti | F16J 15/324 277/916 |
| 4,884,665 | A | * | 12/1989 | Parker | F16F 9/364 29/520 |
| 5,176,229 | A | * | 1/1993 | Kanari | F16F 9/364 188/315 |
| 5,544,895 | A | * | 8/1996 | Heine | F16J 15/3228 277/576 |
| 6,666,459 | B1 | * | 12/2003 | Hufnagel | F16J 15/3252 277/572 |
| 8,276,919 | B2 | * | 10/2012 | Abe | F16J 15/3236 277/549 |
| 8,322,726 | B2 | * | 12/2012 | Kurth | F16J 15/3244 277/559 |
| 8,720,902 | B2 | * | 5/2014 | Kofler | F16J 15/48 277/558 |
| 9,303,768 | B2 | * | 4/2016 | Hamaya | F16J 15/32 |
| 10,161,522 | B2 | * | 12/2018 | Colineau | F16J 15/064 |
| 2001/0030398 | A1 | * | 10/2001 | Hosokawa | F16J 15/3228 277/549 |
| 2003/0075872 | A1 | * | 4/2003 | Ikeda | F16J 15/3232 277/560 |
| 2008/0169613 | A1 | * | 7/2008 | Ashida | F16J 15/322 277/559 |
| 2009/0166983 | A1 | * | 7/2009 | Ebihara | F16J 15/3232 277/553 |
| 2010/0308542 | A1 | * | 12/2010 | Abe | F15B 15/1461 277/434 |
| 2013/0119611 | A1 | * | 5/2013 | Kofler | F16J 15/48 277/353 |
| 2014/0077459 | A1 | * | 3/2014 | Hamaya | F16J 15/32 277/549 |
| 2014/0203514 | A1 | * | 7/2014 | Colineau | F16J 15/064 277/549 |
| 2016/0146351 | A1 | * | 5/2016 | Janian | F16J 15/3204 277/560 |
| 2016/0265665 | A1 | * | 9/2016 | Desjardins | F16J 15/3252 |
| 2017/0108073 | A1 | * | 4/2017 | Scaramozzino | F16J 15/56 |

FOREIGN PATENT DOCUMENTS

| | | |
|---|---|---|
| JP | S52-081561 U | 6/1977 |
| JP | H02-043564 U | 3/1990 |
| JP | H04-013867 U | 2/1992 |
| JP | H10-204652 A | 8/1998 |
| JP | 2002-323139 A | 11/2002 |
| JP | 2006-300191 A | 11/2006 |
| JP | 2015-203491 A | 11/2015 |
| JP | 2018-004030 A | 1/2018 |
| WO | 2018/097024 A1 | 5/2018 |

OTHER PUBLICATIONS

Extended European Search Report dated Jun. 7, 2022 (corresponding to EP 19878848.1).
Japanese Office Action dated Feb. 8, 2022 with English translation (corresponding to JP 2020-554772).

* cited by examiner

SEALING DEVICE

CROSS-REFERENCE TO RELATED APPLICATIONS

This application is a National Stage of International Application No. PCT/JP2019/030749, filed Aug. 5, 2019 (now WO 2020/090180A1), which claims priority to Japanese Application No. 2018-202819, filed Oct. 29, 2018. The entire disclosures of each of the above applications are incorporated herein by reference.

FIELD

The present disclosure relates to a sealing device to be installed in an exhaust gas recirculation device.

BACKGROUND

Figure 10:
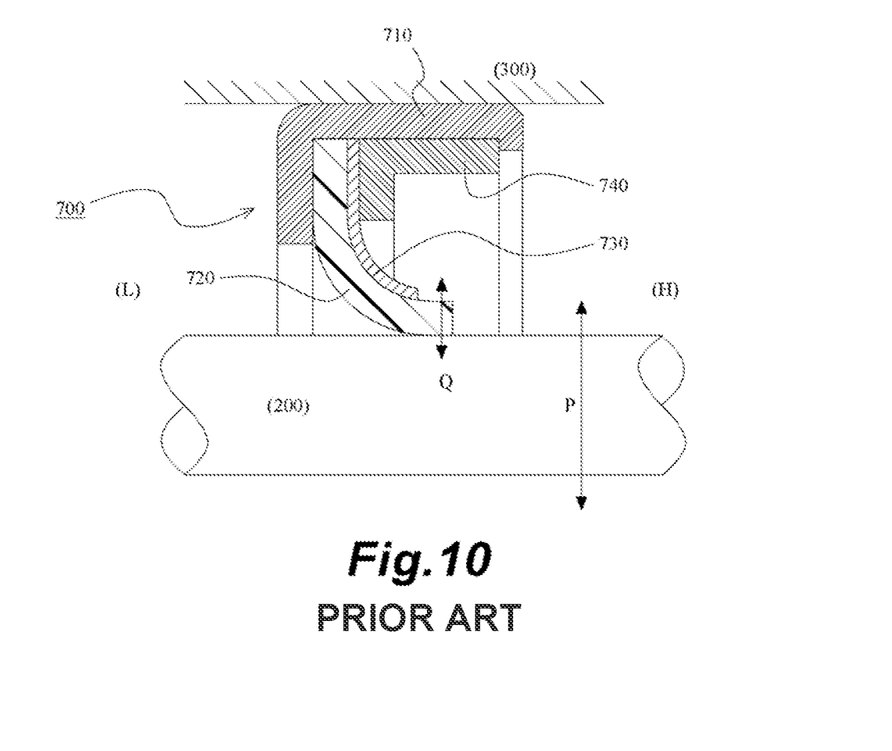
FIG. 10 is a schematic cross-sectional view showing a sealing structure including a sealing device according to a conventional example.

A sealing device to be installed in an exhaust gas recirculation device is subjected to a high-temperature environment. Since a rubber sealing device is less likely to maintain its quality in such an environment, a resin seal is used that is made of resin with high heat resistance and pressure resistance, such as PTFE. However, when used in a high-temperature environment for a long time, a PTFE seal suffers plastic deformation due to creep (creep relaxation) over time, resulting in degraded sealing performance. For this reason, the present applicant has proposed a technique of providing a flat metal spring that presses the resin seal (see PTL 1). Referring to FIG. 10, a sealing device of a conventional example is described below. FIG. 10 is a schematic cross-sectional view showing a sealing structure including the sealing device of the conventional example.

A sealing device 700 of the conventional example functions to seal an annular gap between a rotary shaft 200 and a housing 300. The sealing device 700 includes a metal ring 710, a resin seal 720, a flat spring 730, and a metal fixing ring 740 fixed to the inner circumference surface side of the metal ring 710. The outer circumference side of the flat spring 730 is fixed to the metal ring 710. The inner circumference side of the flat spring 730 is configured to deform to curve along the resin seal 720 and press the edge section on the inner circumference side of the resin seal 720 radially inward. The sealing device 700 thus configured maintains a stable sealing performance over a long time even if the resin seal 720 exhibits creep relaxation after prolonged use in a high-temperature environment.

However, depending on the device in which the sealing device 700 is used, the rotary shaft 200 may be frequently subjected to eccentricity relative to the housing 300 (see arrow P in FIG. 10). In particular, when the eccentricity of the rotary shaft 200 occurs at a high speed, the following motion (see arrow Q in FIG. 10) of the inner circumference edge of the resin seal 720 fails to follow the dynamic eccentricity of the rotary shaft 200, resulting in unstable sealing performance. To solve this issue, a bearing can be provided to limit the eccentricity of the rotary shaft 200. However, providing an additional bearing aside from the sealing device would lead to a larger installation space or higher costs.

CITATION LIST

Patent Literature

[PTL 1] Japanese Patent Application Publication No. 2015-203491

SUMMARY

Technical Problem

An object of the present disclosure is to provide a sealing device capable of limiting the eccentricity of a rotary shaft without providing any additional bearing aside from the sealing device.

Solution to Problem

The present disclosure adopts the following solutions to achieve the object described above.

A sealing device according to the present disclosure is a sealing device to be installed in an exhaust gas recirculation device that recirculates a portion of exhaust gas to intake air, wherein the sealing device is configured to seal an annular gap between a rotary shaft and a housing having a shaft hole for the rotary shaft, the rotary shaft rotating a valve body of a control valve that controls an amount of exhaust gas to be recirculated, and the sealing device includes: a metal ring including a cylindrical section and an inward flange section disposed at one end of the cylindrical section, the cylindrical section being configured to be fitted to an inner circumference surface defining the shaft hole in a close contact state with the inner circumference surface; a resin seal including a plate-shaped annular resin member, an outer circumference side of the resin seal being fixed to the metal ring and an inner circumference side of the resin seal being configured to be in close contact with and slide on an outer circumference surface of the rotary shaft in a state deformed to curve toward a sealing target region; a flat spring including a plate-shaped annular metal member, an outer circumference side of the flat spring being fixed to the metal ring and an inner circumference side of the flat spring being configured to deform to curve along the resin seal and press the inner circumference side of the resin seal radially inward; and a metal slide bearing sandwiched between the resin seal and the inward flange section, the metal slide bearing being configured to slide on the outer circumference surface of the rotary shaft.

Further, another sealing device according to the present disclosure is a sealing device to be installed in an exhaust gas recirculation device that recirculates a portion of exhaust gas to intake air, wherein the sealing device is configured to seal an annular gap between a rotary shaft and a housing having a shaft hole for the rotary shaft, the rotary shaft rotating a valve body of a control valve that controls an amount of exhaust gas to be recirculated, and the sealing device includes: a metal ring including a cylindrical section and an inward flange section disposed at one end of the cylindrical section, the cylindrical section being configured to be fitted to an inner circumference surface defining the shaft hole in a close contact state with the inner circumference surface; a resin seal including a plate-shaped annular resin member, an outer circumference side of the resin seal being fixed to the metal ring and an inner circumference side of the resin seal being configured to be in close contact with and slide on an outer circumference surface of the rotary shaft in a state deformed to curve toward a sealing target region; a flat spring including a plate-shaped annular metal member, an outer circumference side of the flat spring being fixed to the metal ring and an inner circumference side of the flat spring being configured to deform to curve along the resin seal and press the inner circumference side of the resin seal radially inward; an annular metal spacer sandwiched between the resin seal and the inward flange section; and a resin slide bearing disposed on an inner circumference surface side of the spacer and sandwiched between the resin seal and the inward flange section, the resin slide bearing being configured to slide on the outer circumference surface of the rotary shaft.

The sealing device of the present disclosure employs a configuration having the resin seal including a plate-shaped annular resin member. The inner circumference side of the resin seal is configured to slidably and closely come into contact with an outer circumference surface of the rotary shaft in a state deformed to curve toward the sealing target region. The sealing device thus has excellent resistance to heat, for example, and resists sliding wear as compared to a configuration with a rubber elastic seal. Further, the sealing device according to the present disclosure includes the flat spring, which presses the inner circumference side of the resin seal radially inward. This maintains stable sealing performance for a long time even if the resin seal exhibits creep relaxation. The sealing device according to the present disclosure also includes the slide bearing and thus limits the eccentricity of the rotary shaft without providing any additional bearing aside from the sealing device.

Advantageous Effects of the Disclosure

As described above, the present disclosure limits the eccentricity of a rotary shaft without providing a bearing that is separate from the sealing device.

DETAILED DESCRIPTION

Referring to the drawings, exemplary modes for carrying out the present disclosure are described in detail below based on embodiments. The dimensions, materials, shapes, relative arrangements, and the like of the components described in these embodiments are not intended to limit the scope of the present disclosure thereto unless otherwise specified.

Figure 1:
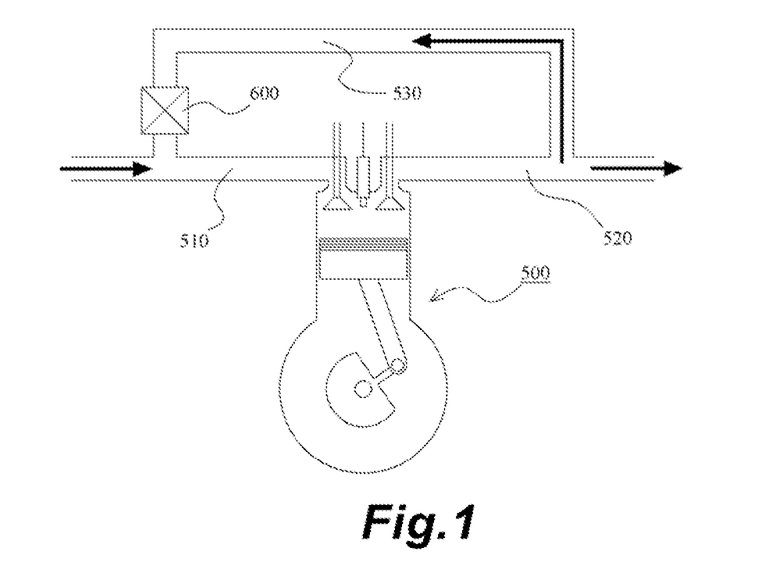
FIG. 1 is a schematic view showing the configuration of an internal combustion engine including an exhaust gas recirculation device.
Figure 2:
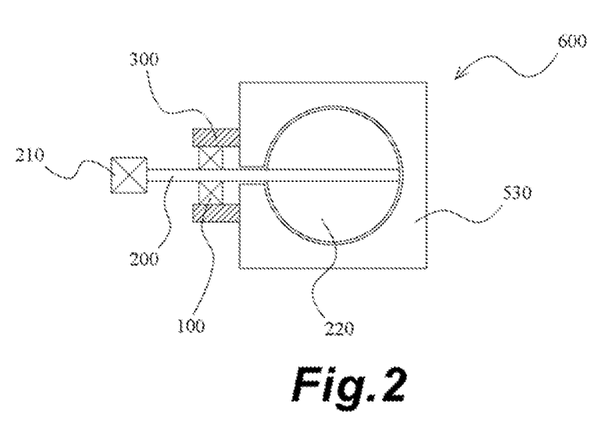
FIG. 2 is a schematic view showing the configuration of a control valve.

The sealing device of each embodiment is to be installed in an exhaust gas recirculation device (hereinafter referred to as an EGR device) that recirculates a portion of exhaust gas to intake air. Before the description of the sealing devices of the present embodiments, the EGR device is first described with reference to FIGS. 1 and 2. FIG. 1 is a schematic view showing the configuration of an internal combustion engine including an EGR device. FIG. 2 is a schematic view showing the configuration of a control valve provided in the EGR device.

As shown in FIG. 1, an intake pipe 510 and an exhaust pipe 520 are connected to an internal combustion engine 500. An EGR device is provided to limit the generation of NOx by recirculating a portion of the exhaust gas to the intake air. The EGR device includes an EGR passage 530 and a control valve (EGR valve) 600 provided in the EGR passage 530. The control valve 600 functions to control the amount of exhaust gas to be recirculated. The arrows in FIG. 1 indicate the directions in which intake air and exhaust gas flow.

The control valve 600 includes a rotary shaft 200, which rotates a valve body 220, and a housing 300, which has a shaft hole for the rotary shaft 200 (see FIG. 2). The rotary shaft 200 is configured to be rotated by a rotating mechanism 210. Further, to limit leakage of the exhaust gas flowing through the EGR passage 530 to the outside of the EGR passage 530, a sealing device 100 is provided to seal the annular gap between the rotary shaft 200 and the housing 300.

First Embodiment

<Sealing Device>

Figure 3:
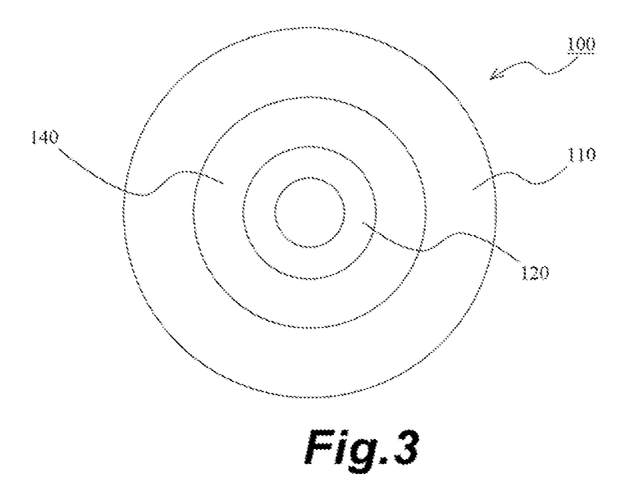
FIG. 3 is a plan view showing a sealing device of the first embodiment according to the present disclosure.
Figure 4:
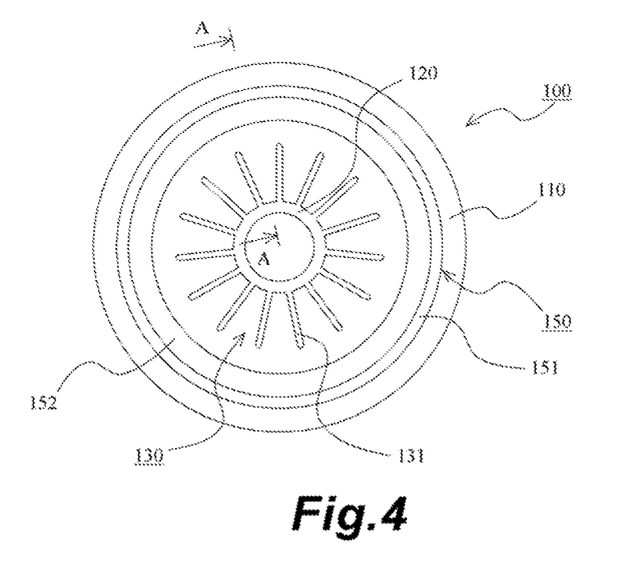
FIG. 4 is a bottom view showing the sealing device of the first embodiment according to the present disclosure.
Figure 5:
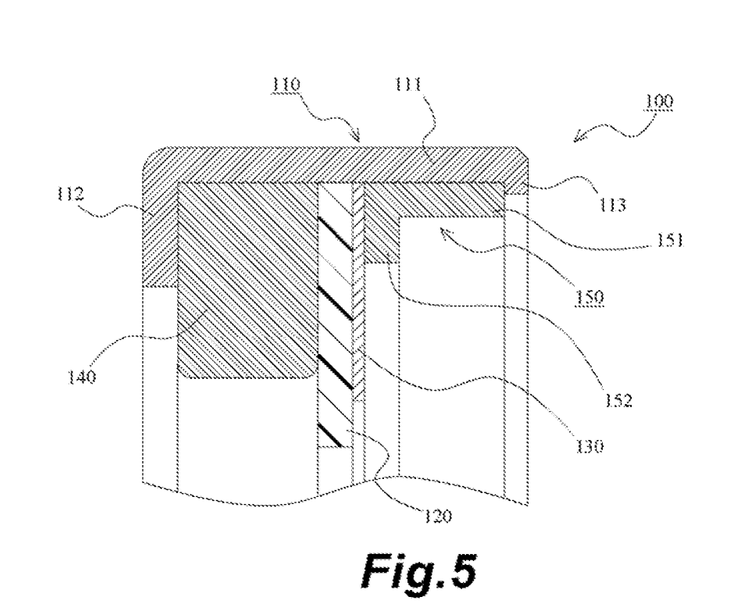
FIG. 5 is a schematic cross-sectional view showing the sealing device of the first embodiment according to the present disclosure.
Figure 6:
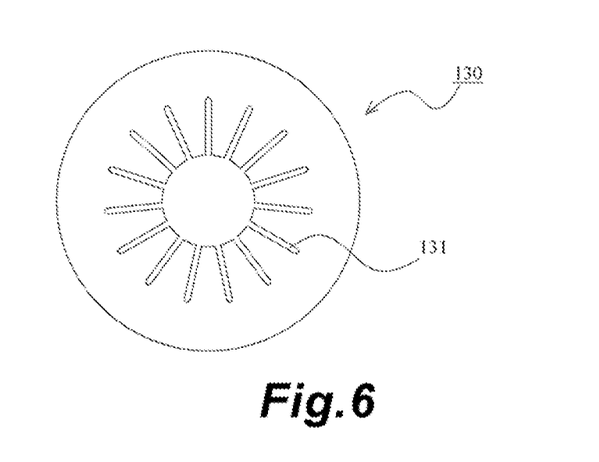
FIG. 6 is a plan view showing a flat spring of the first embodiment according to the present disclosure.
Figure 7:
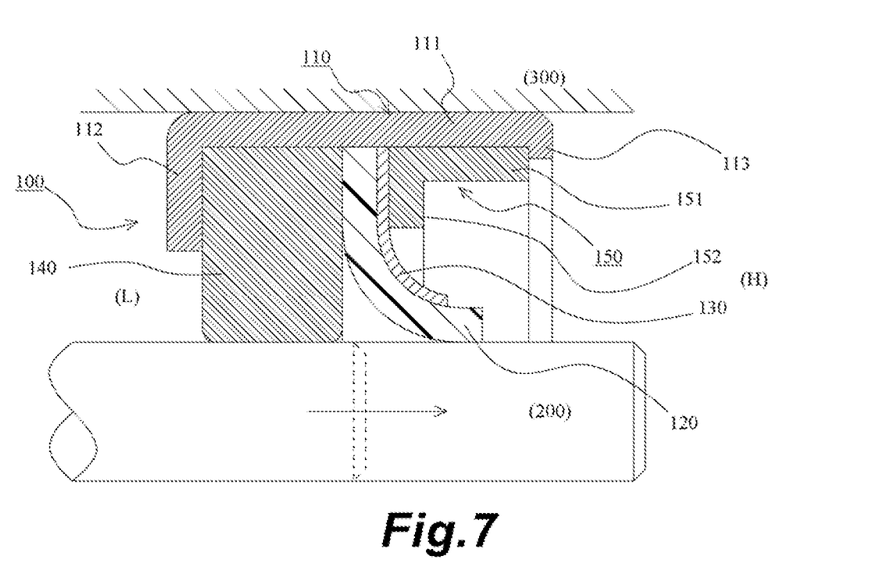
FIG. 7 is a schematic cross-sectional view showing a sealing structure including the sealing device of the first embodiment according to the present disclosure.
Figure 8:
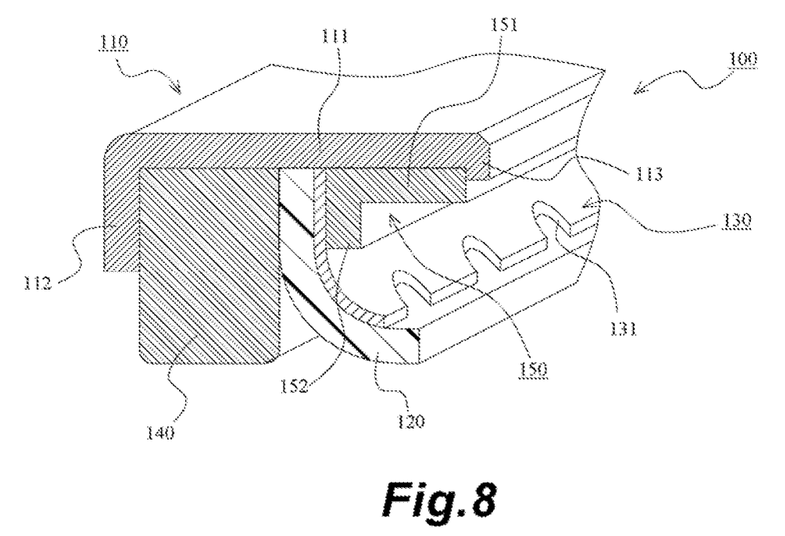
FIG. 8 is a partially cutaway perspective view showing a state in which the sealing device of the first embodiment according to the present disclosure is in use.

Referring to FIGS. 3 to 8, the configuration of the sealing device 100 of the first embodiment according to the present disclosure is now described. FIG. 3 is a plan view showing the sealing device of the first embodiment according to the present disclosure. FIG. 4 is a bottom view showing the sealing device of the first embodiment according to the present disclosure. FIG. 5 is a schematic cross-sectional view showing the sealing device of the first embodiment according to the present disclosure. FIG. 5 is a cross-sectional view taken along line A-A in FIG. 4. FIG. 6 is a plan view showing a flat spring of the first embodiment according to the present disclosure. FIG. 7 is a schematic cross-sectional view showing a sealing structure including the sealing device of the first embodiment according to the present disclosure (in a state in which the sealing device is in use). FIG. 8 is a partially cutaway perspective view showing a state in which the sealing device of the first embodiment according to the present disclosure is used. FIG. 8 schematically shows an area around a cross-section of the sealing device of the first embodiment according to the present disclosure as viewed obliquely. FIG. 8 shows the sealing device of the first embodiment according to the present disclosure in a state in which the sealing device is in use, omitting to showing the shaft and the housing.

The sealing device 100 of the present embodiment includes a metal ring 110, a resin seal 120, a flat spring 130, a metal slide bearing 140, and a metal fixing ring 150 fixed to the inner circumference surface side of the metal ring 110. The metal ring 110 includes a cylindrical section 111, which is configured to be fitted to the inner circumference surface defining the shaft hole in the housing 300 in a close contact state with the inner circumference surface. The metal ring 110 also includes an inward flange section 112 at one end of the cylindrical section 111 and a crimp section 113, which is formed by bending the other end of the cylindrical section 111 radially inward. When the sealing device 100 is in use, the "one end" corresponds to the side opposite to the sealing target region (a low-pressure side (L)), and the "other end" corresponds to the sealing target region side (a high-pressure side (H)).

The resin seal 120 includes a plate-shaped annular resin member. The resin material used in this embodiment is polytetrafluoroethylene (PTFE). The PTFE is characterized by high heat resistance, pressure resistance, and chemical resistance. The PTFE also resists sliding wear. Further, an outer circumference side of the resin seal 120 of the present embodiment is fixed to the metal ring 110 and an inner circumference side of the resin seal 120 is configured to be in close contact with the outer circumference surface of the rotary shaft 200 and to slide on the outer circumference surface of the rotary shaft 200 in a state deformed to curve toward the sealing target region side (the high-pressure side (H)).

The flat spring 130 includes a plate-shaped annular metal member. An outer circumference side of the flat spring 130 is fixed to the metal ring 110 and an inner circumference side of the flat spring 130 is configured to deform to curve along the resin seal 120 and press the edge section on the inner circumference side of the resin seal 120 radially inward. The flat spring 130 further includes multiple inner circumference slits 131, which extend from the inner circumference toward the outer circumference. The inner circumference slits 131 are arranged at intervals in the circumferential direction. In this embodiment, these inner circumference slits 131 are provided at equal intervals in the circumferential direction. The configuration of the flat spring 130 of this embodiment is an example. The flat spring according to the present disclosure may use various known techniques including the configuration disclosed in FIG. 11 of PTL 1 described above.

The slide bearing 140 includes an annular member made of a metal such as SUS. The slide bearing 140 is sandwiched between the resin seal 120 and the inward flange section 112 of the metal ring 110 and configured to slide on the outer circumference surface of the rotary shaft 200. This limits the eccentricity of the rotary shaft 200 relative to the housing 300. The slide bearing 140 of the present embodiment is made of a metal such as SUS as described above and thus has excellent resistance to heat and water condensation, thereby maintaining its quality when used in an EGR device.

The fixing ring 150 includes a cylindrical section 151, which is fixed to the inner circumference surface side of the metal ring 110, and an inward flange section 152, which is disposed at one end of the cylindrical section 151. With the fixing ring 150 placed on the inner circumference surface side of the metal ring 110, the end at the other side (the sealing target region side) of the metal ring 110 is bent radially inward so that this end abuts the end of the fixing ring 150. The crimp section 113 is thus formed. As a result, the outer circumference edge of the resin seal 120, the outer circumference edge of the flat spring 130, and the slide bearing 140 are compressed between the inward flange section 112 and the fixing ring 150. This fixes the outer circumference side of the resin seal 120, the outer circumference side of the flat spring 130, and the slide bearing 140 to the metal ring 110.

<Installation Method and Usage of Sealing Device>

Referring to FIGS. 7 and 8, an installation method and usage of the sealing device 100 of the present embodiment are now described. First, an installation method of the sealing device 100 is described. The sealing device 100 configured as described above is inserted and fitted in the shaft hole provided in the housing 300. In this state, the outer circumference surface of the cylindrical section 111 of the metal ring 110 in the sealing device 100 is in close contact with the inner circumference surface defining the shaft hole. Then, the rotary shaft 200 is inserted from the left side as viewed in FIG. 7 (the side opposite to the sealing target region during use (the low-pressure side (L))) to the right side (the sealing target region side during use (the high-pressure side (H))). The rotary shaft 200 thus presses the edge sections on the inner circumference side of the resin seal 120 and the flat spring 130. This deforms the resin seal 120 and the flat spring 130 such that the sections of the resin seal 120 and the flat spring 130 that are radially inward of the sections compressed between the slide bearing 140 and the fixing ring 150 are curved toward the sealing target region side (the high-pressure side (H)). As a result, the inner circumference surface of the curved section near the edge of the resin seal 120 is in close contact with the outer circumference surface of the rotary shaft 200. Additionally, the inner circumference surface of the curved section near the edge of the flat spring 130 is in close contact with the outer circumference surface of the curved section near the edge of the resin seal 120. Due to the elastic resilience of the flat spring 130, the edge section of the flat spring 130 presses the area near the edge of the curved section of the resin seal 120 radially inward.

Advantages of Sealing Device of Present Embodiment

The sealing device 100 of the present embodiment employs a configuration including the metal ring 110, which has the cylindrical section 111 that is configured to be fitted to the shaft hole in the housing 300 in a close contact state with the inner circumference surface defining the shaft hole. The configuration ensures sufficient sealing between the outer circumference surface of the metal ring 110 and the inner circumference surface defining the shaft hole in the housing 300 even when the housing 300 is a casting (e.g., an aluminum casting). That is, the configuration achieves satisfactory sealing performance even if the inner circumference surface defining the shaft hole in the housing 300 has minute voids, such as porosity.

Further, the sealing device 100 of the present embodiment employs a configuration having the resin seal 120 including a plate-shaped annular resin member. The outer circumference side of the resin seal 120 is fixed to the metal ring 110, and the inner circumference side of the resin seal 120 is configured to be in close contact with and slide on the outer circumference surface of the rotary shaft 200 in a state deformed to curve toward the sealing target region. The sealing device 100 thus has excellent resistance to heat, for example, and resists sliding wear as compared to a configuration with a rubber elastic seal.

Further, the sealing device 100 of the present embodiment includes the flat spring 130, which presses the inner circumference side of the resin seal 120 radially inward. This maintains stable sealing performance for a long time even if the resin seal 120 exhibits creep relaxation after prolonged use in a high-temperature environment.

The sealing device 100 of the present embodiment also includes the slide bearing 140 and thus limits the eccentricity of the rotary shaft 200 without providing any additional bearing aside from the sealing device 100. This limits a decrease in the sealing performance, which would otherwise be caused by the eccentricity of the rotary shaft 200, without increasing the installation space or costs.

Second Embodiment

Figure 9:
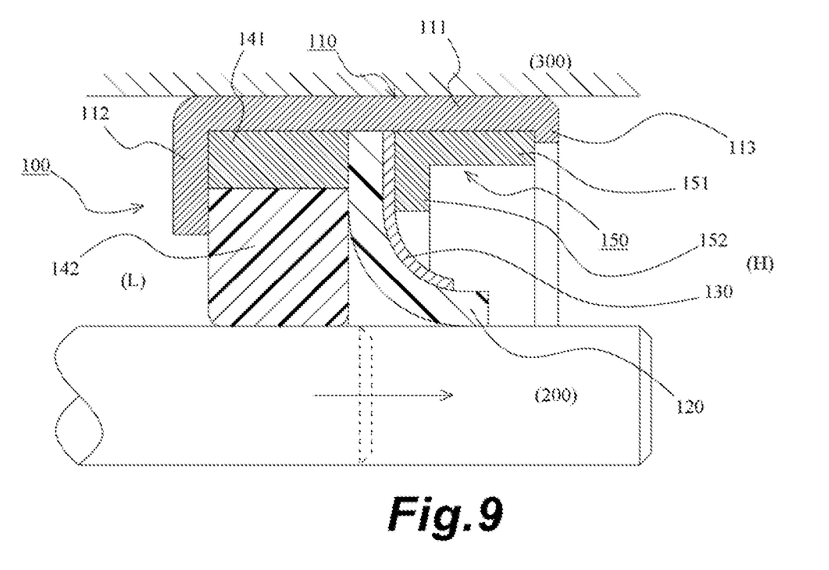
FIG. 9 is a schematic cross-sectional view showing a sealing structure including a sealing device according to the second embodiment of the present disclosure.

FIG. 9 shows the second embodiment according to the present disclosure. This embodiment differs from the first embodiment in the configuration of the slide bearing. The other configurations and operations are the same as those of the first embodiment. Same reference numerals are given to the same components, and the descriptions thereof are omitted.

FIG. 9 is a schematic cross-sectional view showing a sealing structure including a sealing device of the second embodiment according to the present disclosure (a state in which the sealing device is in use). The sealing device 100 of the present embodiment includes a metal ring 110, a resin seal 120, a flat spring 130, an annular metal spacer 141, a resin slide bearing 142, and a metal fixing ring 150 fixed to the inner circumference surface side of the metal ring 110. The metal ring 110, the resin seal 120, the flat spring 130, and the fixing ring 150 have the same configurations as those of the first embodiment and are therefore not described.

The spacer 141 includes an annular member made of a metal such as SUS. The spacer 141 is sandwiched between the resin seal 120 and the inward flange section 112 of the metal ring 110. The spacer 141 is made of a metal such as SUS as described above and thus has excellent resistance to heat and water condensation, thereby maintaining its quality when used in an EGR device.

The slide bearing 142 includes an annular member made of resin. The slide bearing 142 is disposed on the inner circumference surface side of the spacer 141, sandwiched between the resin seal 120 and the inward flange section 112 of the metal ring 110, and is configured to slide on the outer circumference surface of the rotary shaft 200. This limits the eccentricity of the rotary shaft 200 relative to the housing 300.

The installation method of the sealing device 100 and usage of the sealing device 100 are the same as those of the first embodiment and therefore not described.

The sealing device 100 of the present embodiment configured as described above has the same advantages as the first embodiment. Additionally, the slide bearing 142 of the sealing device 100 of the present embodiment is made of a resin material and therefore has a lower sliding resistance than the first embodiment. Although the slide bearing 142 of the present embodiment has lower heat resistance or other characteristics than the metal slide bearing 140 of the first embodiment, this does not cause issues when used in an EGR device since the slide bearing 142 can be replaced without moving the spacer 141 when deteriorated. For example, the annular slide bearing 142 may include an abutment section (e.g., a bias cut) in one position in the circumferential direction. Such a slide bearing 142 can be easily installed and removed for replacement by contracting the slide bearing 142 radially inward.

REFERENCE SIGNS LIST

100 Sealing device
110 Metal ring
111 Cylindrical section
112 Inward flange section
113 Crimp section
120 Resin seal
130 Flat spring
131 Inner circumference slit
140 Bearing
141 Spacer
142 Bearing
150 Fixing ring
151 Cylindrical section
152 Inward flange section
200 Rotary shaft
210 Rotating mechanism
220 Valve body
300 Housing
500 Internal combustion engine
510 Intake pipe
520 Exhaust pipe
530 EGR passage
600 Control valve

The invention claimed is:

1. A sealing device to be installed in an exhaust gas recirculation device that recirculates a portion of exhaust gas to intake air, wherein the sealing device is configured to seal an annular gap between a rotary shaft and a housing having a shaft hole for the rotary shaft, the rotary shaft rotating a valve body of a control valve that controls an amount of exhaust gas to be recirculated, and wherein the sealing device comprises: a metal ring including a cylindrical section and an inward flange section disposed at one end of the cylindrical section, the cylindrical section being configured to be fitted to an inner circumference surface defining the shaft hole in a close contact state with the inner circumference surface; a resin seal including a plate-shaped annular resin member, an outer circumference side of the resin seal being fixed to the metal ring and an inner circumference side of the resin seal being configured to be in close contact with and slide on an outer circumference surface of the rotary shaft in a state deformed to curve toward a sealing target region; a flat spring including a plate-shaped annular metal member, an outer circumference side of the flat spring being fixed to the metal ring and an inner circumference side of the flat spring being configured to deform to curve along the resin seal and press the inner circumference side of the resin seal radially inward; and a metal slide bearing sandwiched between the resin seal and the inward flange section, the metal slide bearing having only a radial flange with an outer surface directly against the cylindrical section of the metal ring and being configured to slide on the outer circumference surface of the rotary shaft to limit an eccentricity of the rotary shaft relative to the housing, wherein the metal slide bearing is tightly secured between the inward flange section and the resin seal.

2. A sealing device to be installed in an exhaust gas recirculation device that recirculates a portion of exhaust gas to intake air, wherein the sealing device is configured to seal an annular gap between a rotary shaft and a housing having a shaft hole for the rotary shaft, the rotary shaft rotating a valve body of a control valve that controls an amount of exhaust gas to be recirculated, and wherein the sealing device comprises: a metal ring including a cylindrical section and an inward flange section disposed at one end of the cylindrical section, the cylindrical section being configured to be fitted to an inner circumference surface defining the shaft hole in a close contact state with the inner circumference surface; a resin seal including a plate-shaped annular resin member, an outer circumference side of the resin seal being fixed to the metal ring and an inner circumference side of the resin seal being configured to be in close contact with and slide on an outer circumference surface of the rotary shaft in a state deformed to curve toward a sealing target region; a flat spring including a plate-shaped annular metal member, an outer circumference side of the flat spring being fixed to the metal ring and an inner circumference side of the flat spring being configured to deform to curve along the resin seal and press the inner circumference side of the resin seal radially inward; an annular metal spacer sandwiched between the resin seal and the inward flange section, the annular metal spacer having only a radial flange with an outer surface directly against the cylindrical section of the metal ring; and a resin slide bearing disposed on an inner circumference surface side of the spacer and sandwiched between the resin seal and the inward flange section, the resin slide bearing having an outer surface directly against the annular metal spacer and being configured to slide on the outer circumference surface of the rotary shaft to limit an eccentricity of the rotary shaft relative to the housing, wherein the resin slide bearing and the spacer are tightly secured between the inward flange section and the resin seal.

3. The sealing device according to claim 1, further comprising a metal fixing ring fixed to an inner circumference surface side of the metal ring, the outer circumference edge of the resin seal,
the outer circumference edge of the flat spring, and the slide bearing are compressed between the inward flange section and the fixing ring, whereby the outer circumference side of the resin seal, the outer circumference side of the flat spring, and the slide bearing are fixed to the metal ring.

4. The sealing device according to claim 3, wherein the metal ring has a crimp section formed by bending one end of the metal ring radially inward so that the one end of the metal ring abuts one end of the fixing ring.

5. The sealing device according to claim 4, wherein the fixing ring has a cylindrical section fixed to the inner circumference surface side of the metal ring and an inward flange section disposed at one end of the cylindrical section, and
the outer circumference edge of the resin seal, the outer circumference edge of the flat spring, and the slide bearing are compressed between the inward flange section of the metal ring and the inward flange section of the fixing ring.

6. The sealing device according to claim 1, wherein the flat spring has multiple slits extending from the inner circumference toward the outer circumference.

7. The sealing device according to claim 2, further comprising a metal fixing ring fixed to an inner circumference surface side of the metal ring,
the outer circumference edge of the resin seal, the outer circumference edge of the flat spring, the slide bearing and the spacer are compressed between the inward flange section and the fixing ring, whereby the outer circumference side of the resin seal, the outer circumference side of the flat spring, the slide bearing and the spacer are fixed to the metal ring.

8. The sealing device according to claim 7, wherein the metal ring has a crimp section formed by bending one end of the metal ring radially inward so that the one end of the metal ring abuts one end of the fixing ring.

9. The sealing device according to claim 8, wherein the fixing ring has a cylindrical section fixed to the inner circumference surface side of the metal ring and an inward flange section disposed at one end of the cylindrical section, and
the outer circumference edge of the resin seal, the outer circumference edge of the flat spring, the slide bearing and the spacer are compressed between the inward flange section of the metal ring and the inward flange section of the fixing ring.

10. The sealing device according to claim 2, wherein the flat spring has multiple slits extending from the inner circumference toward the outer circumference.

11. The sealing device according to claim 2, wherein the slide bearing has an abutment section in one position in a circumferential direction.

12. The sealing device according to claim 11, wherein the abutment section is formed by a bias cut.

13. A sealing structure comprising: an exhaust gas recirculation device that recirculates a portion of exhaust gas to intake air; a control valve that controls an amount of exhaust gas to be recirculated by the exhaust gas recirculation device; and a sealing device is configured to seal an annular gap between a rotary shaft and a housing having a shaft hole for the rotary shaft, the rotary shaft rotating a valve body of the control valve, and wherein the sealing device comprises: a metal ring including a cylindrical section and an inward flange section disposed at one end of the cylindrical section, the cylindrical section being configured to be fitted to an inner circumference surface defining the shaft hole in a close contact state with the inner circumference surface; a resin seal including a plate-shaped annular resin member, an outer circumference side of the resin seal being fixed to the metal ring and an inner circumference side of the resin seal being configured to be in close contact with and slide on an outer circumference surface of the rotary shaft in a state deformed to curve toward a sealing target region; a flat spring including a plate-shaped annular metal member, an outer circumference side of the flat spring being fixed to the metal ring and an inner circumference side of the flat spring being configured to deform to curve along the resin seal and press the inner circumference side of the resin seal radially inward; and a metal slide bearing sandwiched between the resin seal and the inward flange section, the metal slide bearing having only a radial flange with an outer surface directly against the cylindrical section of the metal ring and being configured to slide on the outer circumference surface of the rotary shaft to limit an eccentricity of the rotary shaft relative to the housing, wherein the slide bearing is tightly secured between the inward flange section and the resin seal.

14. A sealing structure comprising: an exhaust gas recirculation device that recirculates a portion of exhaust gas to intake air; a control valve that controls an amount of exhaust gas to be recirculated by the exhaust gas recirculation device; and a sealing device is configured to seal an annular gap between a rotary shaft and a housing having a shaft hole for the rotary shaft, the rotary shaft rotating a valve body of the control valve, and wherein the sealing device comprises: a metal ring including a cylindrical section and an inward flange section disposed at one end of the cylindrical section, the cylindrical section being configured to be fitted to an inner circumference surface defining the shaft hole in a close contact state with the inner circumference surface; a resin seal including a plate-shaped annular resin member, an outer circumference side of the resin seal being fixed to the metal ring and an inner circumference side of the resin seal being configured to be in close contact with and slide on an outer circumference surface of the rotary shaft in a state deformed to curve toward a sealing target region; a flat spring including a plate-shaped annular metal member, an outer circumference side of the flat spring being fixed to the metal ring and an inner circumference side of the flat spring being configured to deform to curve along the resin seal and press the inner circumference side of the resin seal radially inward; an annular metal spacer sandwiched between the resin seal and the inward flange section, the annular metal spacer having only a radial flange with an outer surface directly against the cylindrical section of the metal ring; and a resin slide bearing disposed on an inner circumference surface side of the spacer and sandwiched between the resin seal and the inward flange section, the resin slide bearing having an outer surface directly against the annular metal spacer and being configured to slide on the outer circumference surface of the rotary shaft to limit an eccentricity of the rotary shaft relative to the housing, wherein the resin slide bearing and the annular metal spacer are tightly secured between the inward flange section and the resin seal.

\* \* \* \* \*